(12) United States Patent
Kretschmer (10) Patent No.: US 7,571,610 B2
(45) Date of Patent: Aug. 11, 2009

(54) EXTENDIBLE EXHAUST NOZZLE BELL FOR A ROCKET ENGINE

(75) Inventor: Joachim Kretschmer, Feldafing (DE)

(73) Assignee: EADS Space Transportation GmbH, Bremen (DE)

( * ) Notice: Subject to any disclaimer, the term of this patent is extended or adjusted under 35 U.S.C. 154(b) by 847 days.

(21) Appl. No.: 10/804,124

(22) Filed: Mar. 19, 2004

(65) Prior Publication Data

US 2009/0178415 A1 Jul. 16, 2009

(30) Foreign Application Priority Data

Mar. 20, 2003 (DE) ................................ 103 12 419

(51) Int. Cl.
*F02K 1/00* (2006.01)
(52) U.S. Cl. .......................................... 60/771; 60/232
(58) Field of Classification Search .................. 60/771, 60/242, 200.1, 232; 239/265.33, 265.15, 239/265.43
See application file for complete search history.

(56) References Cited

U.S. PATENT DOCUMENTS 3,270,504 A * 9/1966 Ward ..................... 239/265.33
3,596,465 A 8/1971 Pryor et al.
3,711,027 A * 1/1973 Carey ..................... 239/265.19
4,426,038 A 1/1984 Inman et al.
4,638,947 A 1/1987 Jaqua et al.
4,676,436 A * 6/1987 Willis ..................... 239/265.33
4,706,886 A 11/1987 Jencek

* cited by examiner

*Primary Examiner*—Michael Cuff
*Assistant Examiner*—Andrew Nguyen
(74) *Attorney, Agent, or Firm*—Greenblum & Bernstein, P.L.C.

(57) ABSTRACT

Extendible exhaust nozzle bell for rocket engine of aircraft or spacecraft includes a first part with smaller diameter fixedly arranged on motor of engine and a second part with larger diameter arranged in flexible manner with respect to first part. In a front stowed position, second part is located surrounding first part closer to the rocket motor and, in a rear operating position, first part is arranged further away from the rocket motor. A closed volume that can be acted on by a gaseous fluid causes an extension of the second part of the exhaust nozzle bell from the stowed position into the operating position. The closed volume is formed at least in part by a deformable rolling bellows arrangement coupled between the flexibly arranged second part of the exhaust nozzle bell and a fixed part of the rocket engine or of the aircraft or spacecraft.

30 Claims, 4 Drawing Sheets

Position I

Position II

EXTENDIBLE EXHAUST NOZZLE BELL FOR A ROCKET ENGINE

CROSS-REFERENCE TO RELATED APPLICATIONS

The present application claims priority under 35 U.S.C. §119 of German Patent Application No. 103 12 419.5, filed on Mar. 20, 2003, the disclosure of which is expressly incorporated by reference herein in its entirety.

BACKGROUND OF THE INVENTION

1. Field of the Invention

The invention relates to an extendible exhaust nozzle bell for a rocket engine of an aircraft or spacecraft which includes a first part having a smaller diameter fixedly arranged on the motor of the rocket engine and a second part having a larger diameter arranged in a flexible manner with respect to the first part. In this manner, in a front stowed position, the second part is located to surround the first part closer to the rocket motor and, in a rear operating position, to continue the first part and to be arranged further away from the rocket motor with a closed volume that can be acted on by a gaseous fluid. The volume when acted on by the gaseous fluid under enlargement of the volume causes an extension of the second part of the exhaust nozzle bell from the stowed position into the operating position.

2. Discussion of Background Information

An extendible exhaust nozzle bell for a rocket engine is known from U.S. Pat. No. 4,706,886, which comprises a first part with smaller diameter fixedly arranged on the motor of the rocket engine and a second part with larger diameter arranged in a flexible manner with respect to the first part, whereby in a front stowed position (with respect to the flight direction of the aircraft or spacecraft) the second part is located surrounding the first part closer to the rocket motor and in a rear operating position (relative to the flight direction, continuing the first part, is arranged further away from the rocket motor. A closed volume that can be acted on by a gaseous fluid, which volume when acted on by the gaseous fluid under enlargement of the volume causes an extension of the second part of the exhaust nozzle bell from the stowed position into the operating position. With the known exhaust nozzle bell, this closed volume is provided by an essentially cylindrical bellows with an annular cross section which is arranged inside the exhaust nozzle bell. In the stowed position these bellows are folded together flat and when acted on with the gaseous fluid are unfolded in the axial direction of the rocket engine and thus cause an extension of the second part of the exhaust nozzle bell from the stowed position into the operating position. After the operating position has been reached in which the second part of the exhaust nozzle bell has been locked to the first part of the exhaust nozzle bell by a locking mechanism, the bellows are released and jettisoned from the second part of the exhaust nozzle bell by corresponding release mechanisms provided especially for this. A disadvantage in the known extendible exhaust nozzle bell is a relatively complicated structure of the bellows and the said release mechanisms which is associated with a high weight. Furthermore, due to the complicated structure there is a certain danger of a defective function.

SUMMARY OF THE INVENTION

The present invention creates an extendible exhaust nozzle bell of the presupposed type which is mechanically structured with few components in a simple and robust manner and features a low weight.

The instant invention provides an extendible exhaust nozzle bell, in which the closed volume that can be acted on by the gaseous fluid is formed at least in part by a deformable rolling bellows arrangement coupled between the flexibly arranged second part of the exhaust nozzle bell and a fixed part of the rocket engine or of the aircraft or spacecraft.

Advantageous further developments and embodiments of the extendible exhaust nozzle bell according to the invention are characterized in the dependent claims.

Through the invention an extendible exhaust nozzle bell for a rocket engine of an aircraft or spacecraft is created which comprises a first part with smaller diameter fixedly arranged on the motor of the rocket engine and a second part with larger diameter arranged in a flexible manner with respect to the first part, whereby in a front stowed position (with respect to the flight direction of the aircraft or spacecraft) the second part is located surrounding the first part closer to the rocket motor, and in a rear operating position (with respect to the flight direction) continuing the first part is arranged further away from the rocket motor, and with a closed volume that can be acted on by a gaseous fluid, which volume, when acted on by the gaseous fluid, under enlargement of the volume causes an extension of the second part of the exhaust nozzle bell from the stowed position into the operating position. According to the invention it is provided that the closed volume that can be acted on by the gaseous fluid is formed at least in part by a deformable rolling bellows arrangement coupled between the flexibly arranged second part of the exhaust nozzle bell and a fixed part of the rocket engine or of the aircraft or spacecraft.

One advantage of the extendible exhaust nozzle bell according to the invention is a great reliability of the function due to the activation with a gaseous fluid that can be removed from an existing pressure gas supply (purge). Another advantage is that high extension and centering forces can be applied through large-surface pressurization, through which great transverse forces and maneuvering forces are tolerable.

According to a preferred embodiment, the rolling bellows arrangement comprises at least one rolling bellows embodied essentially in a rotationally symmetrical manner with respect to the longitudinal axis of the rocket engine.

Preferably the at least one rolling bellows is embodied circulating over the entire circumference of the exhaust nozzle bell. One advantage of this is a large-surface power supply with centering function through the rolling bellows on the exhaust nozzle bell.

According to a preferred embodiment of the invention, the rolling bellows arrangement comprises a first rolling bellows that, forming a seal for the gaseous fluid, is connected on the one hand to a circumferential area of the first part of the exhaust nozzle bell or another fixed part of the aircraft or spacecraft and on the other hand to a circumferential area of the second part of the exhaust nozzle bell, and a second bellows that forms a further seal of the volume for the gaseous fluid limited by the first rolling bellows.

According to a preferred embodiment of the invention, the second bellows can hereby be a sealing bellows that closes the jet opening of the second part of the exhaust nozzle bell and together with the first rolling bellows and the first and second part of the exhaust nozzle bell limits the closed volume acted on by the gaseous fluid inside the exhaust nozzle bell.

In this last-mentioned embodiment it can be preferably provided that the circumferential area of the first part of the exhaust nozzle bell, to which the first rolling bellows is connected on the one hand, is provided at the rear end of the first part of the exhaust nozzle bell, and that the circumferential area of the second part of the exhaust nozzle bell to which the first rolling bellows is connected on the other hand is provided at the front end of the second part of the exhaust nozzle bell.

In these embodiments in which the closed volume that can be acted on by the gaseous fluid is limited inside the exhaust nozzle bell, preferably a preset breaking point is provided in the sealing bellows at which after the extension of the second part of the exhaust nozzle bell into the operating position the sealing bellows bursts open in order to clear the jet opening. The burst sealing bellows is then completely separated and/or removed by burning or melting after ignition of the rocket engine.

According to another embodiment of the invention, it is provided that the second bellows is a second rolling bellows, which on the one hand is connected to a fixed part of the aircraft or spacecraft, if necessary also in the form of the first part of the exhaust nozzle bell itself, and on the other hand to a circumferential area of the second part of the exhaust nozzle bell, and forms a further seal for the gaseous fluid which seal lies at least in part radially outside with respect to the first rolling bellows, whereby the closed volume that can be acted on by the gaseous fluid is located at least in part outside the exhaust nozzle bell and is limited between the first rolling bellows and the second rolling bellows.

In this embodiment, the circumferential area of the second part of the exhaust nozzle bell to which the second rolling bellows is connected can be essentially the same circumferential area to which the first rolling bellows is also connected.

Alternatively, it can be provided that the circumferential area of the second part of the exhaust nozzle bell to which the second rolling bellows is connected is a different one from the circumferential area to which the first rolling bellows is connected, and is located radially outside and to the rear of the latter.

According to a preferred further development of all the embodiments of the exhaust nozzle bell according to the invention, a retaining device for braking the movement during the extension of the second part of the exhaust nozzle bell from the stowed position into the operating position.

This retaining device can be used at the same time to center the second part of the exhaust nozzle bell during the extension from the stowed position into the operating position.

According to an embodiment of the invention, the retaining device can comprise one or more retaining cables coupled with a cable brake and extending between the second part of the exhaust nozzle bell and a fixed-part of the aircraft or spacecraft, if necessary also in the form of the first part of the exhaust nozzle bell itself.

Alternatively or additionally to the last-mentioned embodiments, the retaining device can comprise a retaining bellows that extends between a circumferential area of the first part of the exhaust nozzle bell and a circumferential area of the second part of the exhaust nozzle bell and is arranged at the front with respect to the first rolling bellows and together with the first rolling bellows forms a further closed volume that can be acted on with a gaseous fluid, which volume when acted on with the gaseous fluid under enlargement of the volume causes a braking of the movement during the extension of the second part of the exhaust nozzle bell from the stowed position into the operating position.

It can hereby be preferably provided that the retaining bellows are fixed to a circumferential area of the second part of the exhaust nozzle bell which area is located radially outside the circumferential area to which the first rolling bellows is connected.

It is hereby provided in particular that the retaining bellows are arranged between the first rolling bellows and the second rolling bellows, thus inside the closed volume limited between the first rolling bellows and the second rolling bellows.

According to another preferred embodiment of the invention the retaining device can comprise a retaining and centering bellows extending between a front circumferential area of the first part and a front circumferential area of the second part of the exhaust nozzle bell.

Alternatively or additionally, the retaining device can comprise a retaining and centering bellows extending between the rear circumferential area of the first part and a rear circumferential area of the second part of the exhaust nozzle bell.

In the two last embodiments, the retaining and centering bellows are preferably embodied such that during the extension of the second part of the exhaust nozzle bell from the stowed position into the operating position after a certain length of the path of the extension movement, at the latest after reaching the operating position of the second part of the exhaust nozzle bell, it bursts or is separated, e.g., through a preset breaking point.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 1a) and b) A somewhat diagrammatic, partially sectional side view of a rocket engine with an extendible exhaust nozzle bell according to a first exemplary embodiment of the invention;

FIGS. 2a) and b) A somewhat diagrammatic, partially sectional side view of a rocket engine with an extendible exhaust nozzle bell according to a second exemplary embodiment of the invention;

FIGS. 3a) and b) A somewhat diagrammatic, partially sectional side view of a rocket engine with an extendible exhaust nozzle bell according to a third exemplary embodiment of the invention; and FIGS. 4a) and b) A somewhat diagrammatic, partially sectional side view of a rocket engine with an extendible exhaust nozzle bell according to fourth exemplary embodiment of the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
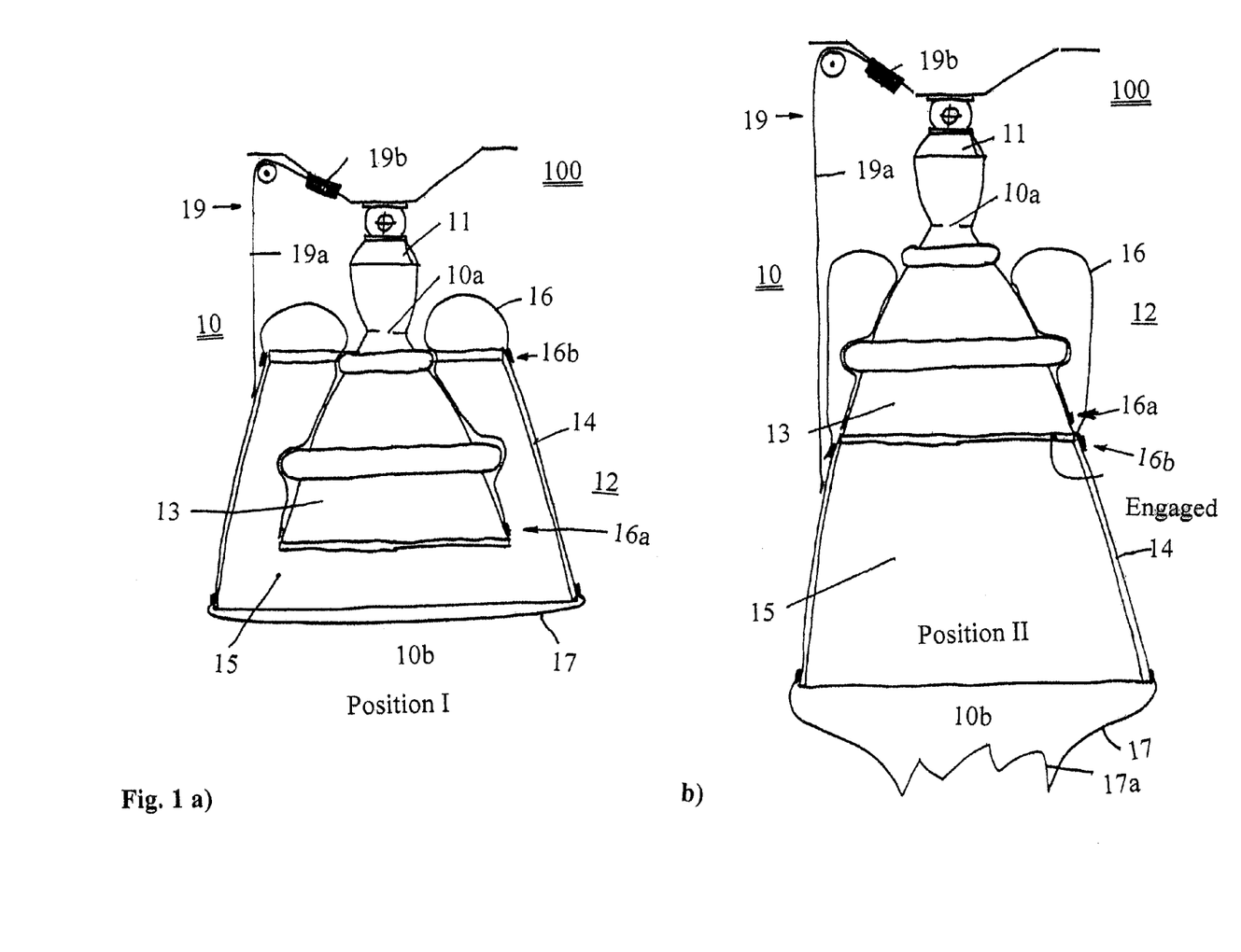
Figure 2:
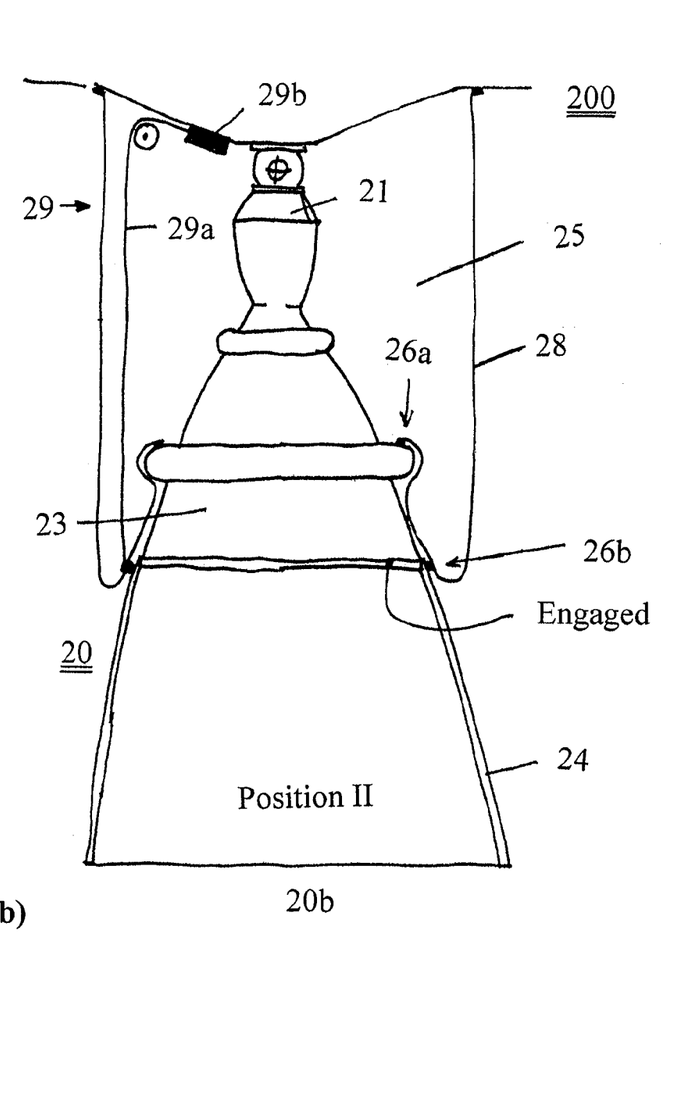
Figure 3:
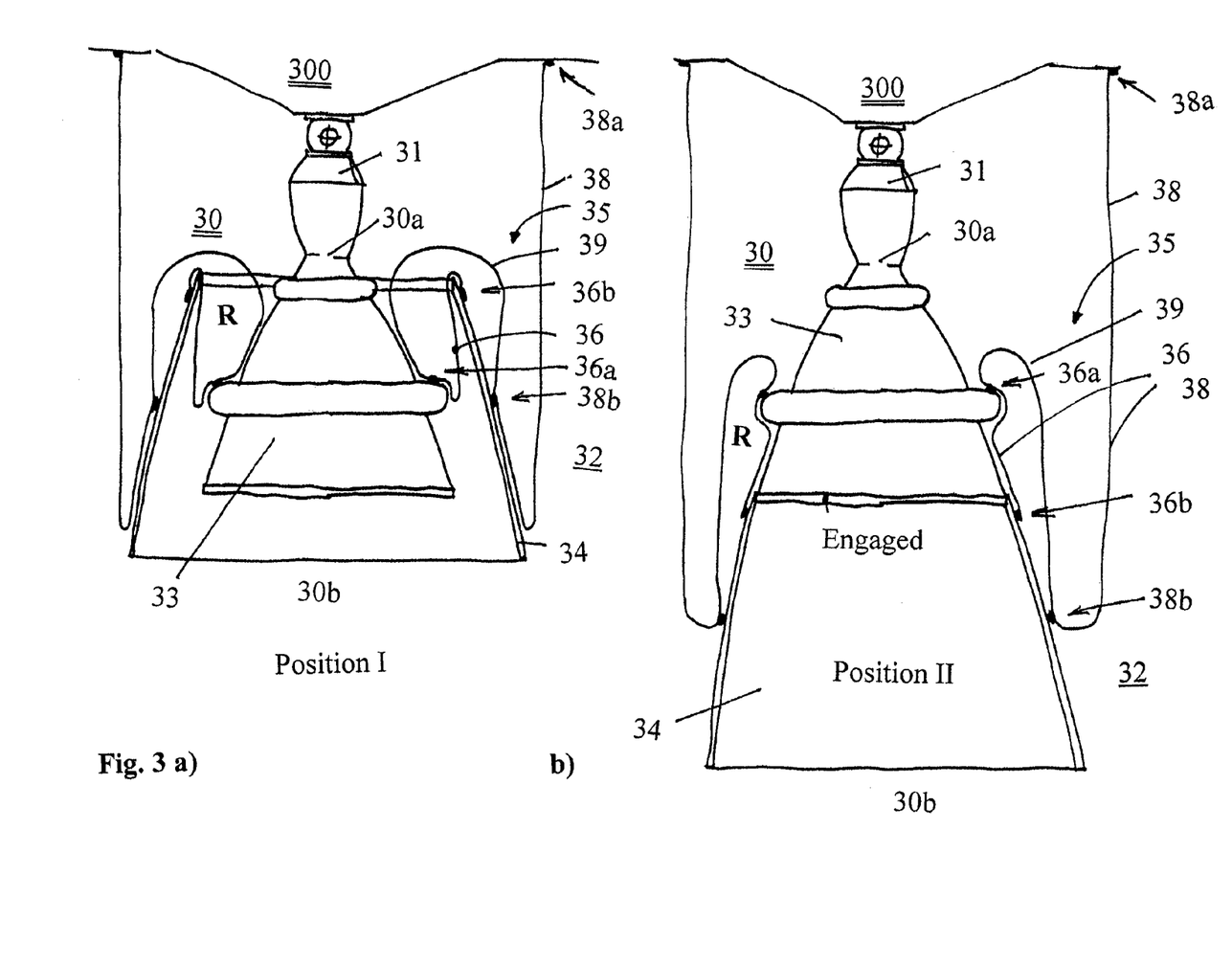
Figure 4:
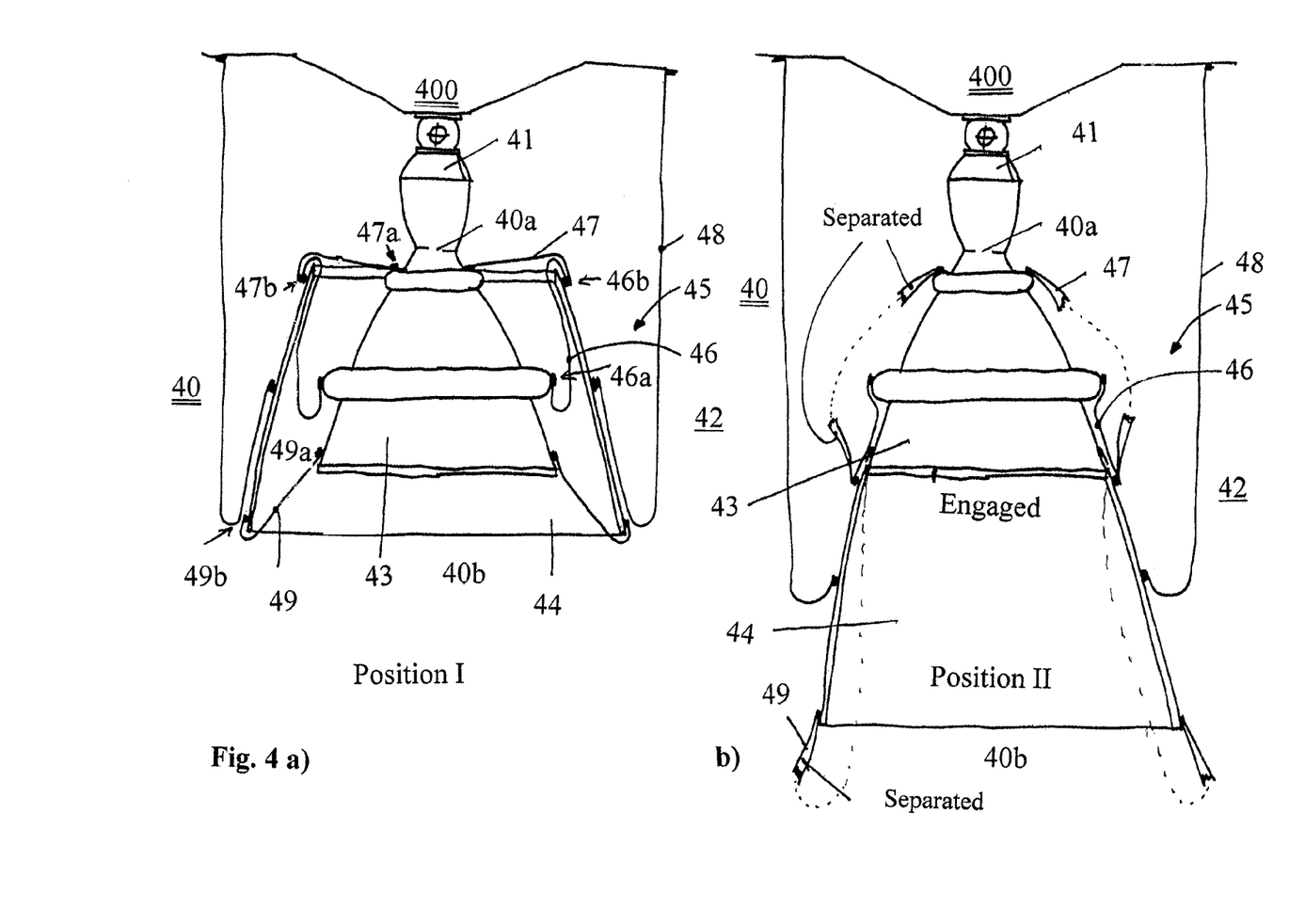

In the exemplary embodiments of an extendible exhaust nozzle bell for a rocket engine of an aircraft or spacecraft shown in FIGS. 1 through 4, the reference number 100; 200; 300; 400 means a rear area of the aircraft or spacecraft in the flight direction of the same on which a motor 11; 21; 31; 41 of the rocket engine is arranged, which as a whole is labeled with the reference number 10; 20; 30; 40. An extendible exhaust nozzle bell 12; 22; 32; 42 is arranged on the motor 11; 21; 31; 41. This is used in a known manner to expand in a controlled manner the combustion gases streaming out backwards at high speed from the motor 11; 21; 31; 41 of the rocket engine 10; 20; 30; 40 such that their speed is reduced for a maximum impulse transmission to the aircraft or spacecraft for the purpose of its thrust. To this end a considerable expansion ratio is necessary between the nozzle cross section 10a; 20a; 30a; 40a at which the combustion gases enter from the motor 11; 21; 31; 41 into the exhaust nozzle bell 12; 22; 32; 42 at its front end, and the cross-sectional area of the jet opening 10b at the rear end of the exhaust nozzle bell 12; 22; 32; 42 at which the combustion gases emerge. This means, allowing for an optimum curved shape of the exhaust nozzle bell 12; 22; 32; 42, a considerable length of the same. So that the space required for the exhaust nozzle bell 12; 22; 32; 42 is kept within limits, this is therefore provided in a divided and extendible form. The exhaust nozzle bell 12; 22; 32; 42 namely comprises a first part 13; 23; 33; 43 with a smaller diameter fixedly arranged on the motor 11; 21; 31; 41 of the rocket engine 10; 20; 30; 40 and a second part 14; 24; 34; 44 with larger diameter arranged in a flexible manner with respect to the first part 13; 23; 33; 43.

In a front stowed position I that is respectively shown in FIGS. 1a), 2a), 3a) and 4a), the second part 14; 24; 34; 44 of the exhaust nozzle bell 12; 22; 32; 42 is located surrounding the first part 13; 23; 33; 43 of the exhaust nozzle bell 12; 22; 32; 42 closer to the rocket motor 11; 21; 31; 41 and in a rear operating position II that is shown in FIGS. 1b), 2b), 3b) and 4b), continuing the first part 13; 23; 33; 43 of the exhaust nozzle bell 12; 22; 32; 42 is arranged further away from the rocket motor 11; 21; 31; 41, thus further to the rear. In this rear operating position II, the second part 14; 24; 34; 44 of the exhaust nozzle bell 12; 22; 32; 42 can be firmly locked by a suitable locking mechanism, e.g., an engaging spring mechanism, which, however, is not specifically shown in the figures.

To extend the second part 14; 24; 34; 44 of the exhaust nozzle bell 12; 22; 32; 42 from the stowed position I into the operating position II, a closed volume 15; 25; 35; 45 is provided that can be acted on by a gaseous fluid, which volume when acted on by the gaseous fluid enlarging the volume causes the extension of the second part 14; 24; 34; 44.

In general, this volume 15; 25; 35; 45 that can be acted on by the gaseous fluid is formed at least in part by a deformable rolling bellows arrangement 16; 26, 28; 36, 38, 39; 46, 48 coupled between the flexibly arranged second part 14; 24; 34; 44 of the exhaust nozzle bell 12; 22; 32; 42 and a fixed part of the rocket engine 10; 20; 30; 40 or of the aircraft or spacecraft 100; 200; 300; 400. In the exemplary embodiments shown in FIGS. 1 through 4, the rolling bellows arrangement contains at least one rolling bellows 16; 26, 28; 36, 38, 39; 46, 48 that is embodied essentially in a rotationally symmetrical manner with respect to the longitudinal axis of the rocket engine 10; 20; 30; 40 and is embodied circulating over the entire circumference of the exhaust nozzle bell 12; 22; 32; 42, thus over 360°. The rolling bellows 16; 26, 28; 36, 38, 39; 46, 48, like possibly further rolling bellows of the rolling bellows arrangement as well, are stretched and correspondingly rolled out during the extension.

In the first exemplary embodiment of the extendible exhaust nozzle bell according to the invention shown in FIGS. 1a) and b), the rolling bellows arrangement comprises a first rolling bellows 16 that is connected on the one hand to a circumferential area 16a of the first part 13 of the exhaust nozzle bell 12 and on the other hand to a circumferential area 16b of the second part 14 of the exhaust nozzle bell 12, whereby the circumferential area 16a of the first part 13 to which the first rolling bellows 16 on the one hand is connected is provided on the rear end of the first part 13, and the circumferential area 16b of the second part 14 to which the first rolling bellows 16 on the other hand is connected, is located on the front end of the second part 14. Furthermore a second bellows in the form of a sealing bellows 17 is provided which closes the jet opening 10b at the rear end of the second part 14 of the exhaust nozzle bell 12 and together with the first rolling bellows 16 and the first and second part 13, 14 of the exhaust nozzle bell 12 limits the closed volume 15 that can be acted on by the gaseous fluid inside the exhaust nozzle bell 12.

Furthermore, a retaining device 19 is provided that is used to brake the movement during the extension of the second part 14 of the exhaust nozzle bell 12 from the stowed position I into the operating position II, and comprises one or preferably more retaining cables 19a distributed over the circumference of the exhaust nozzle bell 12 and extending between the second part 14 of the exhaust nozzle bell 12 and a fixed part of the aircraft or spacecraft 100, and a cable brake 19b to which the retaining cables 19a are coupled.

The sealing bellows 17 at the rear end of the second part 14 of the exhaust nozzle bell 12 has a preset breaking point 17a that is provided in order to burst open after the extension of the second part 14 of the exhaust nozzle bell 12 into the operating position II and to clear the jet opening 10b. The sealing bellows 17 is completely separated by burning or melting after the bursting at the preset breaking point 17a by the emerging hot combustion gases after the ignition of the rocket engine 10.

To extend the second part 14 of the exhaust nozzle bell 12 from the stowed position I shown in FIG. 1a), the closed volume 15 located in the interior of the exhaust nozzle bell 12 is pressurized by a gaseous fluid, through which this has a tendency to expand and to extend backwards the second part 14 of the exhaust nozzle bell 12 until the operating position II shown in FIG. 1b) has been reached. The extension movement is thereby braked and at the same time centered by the retaining device 19. When the operating position II is reached, the second part 14 of the exhaust nozzle bell 12 is engaged by the engaging or locking device (not shown in detail) already mentioned earlier.

In the second exemplary embodiment of the invention shown in FIGS. 2a and b), a first rolling bellows 26 is provided as a component of a rolling bellows arrangement, which rolling bellows is connected on the one hand to a circumferential area 26a of the first part 23 of the exhaust nozzle bell 22 and on the other hand to a circumferential area 26b of the second part 14 of the exhaust nozzle bell 12, whereby the circumferential area 26a is located on the first part 23 of the exhaust nozzle bell 22 to which the first rolling bellows 26 is attached, not on the rear end of the first part 23 of the exhaust nozzle bell 22, but further forward. The circumferential area 26b to which the first rolling bellows 26 is attached on the other hand, is located on the front end of the second part 24 of the exhaust nozzle bell 22.

Furthermore the rolling bellows arrangement comprises a second rolling bellows 28 that is connected on the one hand to a fixed part 28a of the aircraft or spacecraft 200 and on the other hand to a circumferential area of the second part 24 of the exhaust nozzle bell 22, which essentially is the same circumferential area 26b to which the first rolling bellows 26 is also connected. The second rolling bellows 28 forms a further seal for the closed volume 25 that can be acted on by the gaseous fluid, which seal lies radially outside with respect to the first rolling bellows 26, which volume is located in this exemplary embodiment outside the exhaust nozzle bell 22 and is limited between the first rolling bellows 26, the second rolling bellows 28 and the rear end of the aircraft or spacecraft 200.

As in the first exemplary embodiment shown in FIGS. 1a) and b), in the second exemplary embodiment a retaining device 29 is also provided that is used to brake the movement during the extension of the second part 24 of the exhaust nozzle bell 22 from the stowed position I into the operating position II and which comprises one or more retaining cables 29a extending between the second part 24 of the exhaust nozzle bell 12 and a fixed part of the aircraft or spacecraft 200 and a cable brake 29b to which the retaining cables 29a are coupled.

To extend the second part 24 of the exhaust nozzle bell 22 from the front stowed position I shown in FIG. 2a) into the rear operating position II shown in FIG. 2b), the closed volume 25 lying between the first rolling bellows 26 and the second rolling bellows 28 is acted on with the gaseous fluid, through which it has a tendency to enlarge and the second part 24 of the exhaust nozzle bell 22 is extended into the operating position II. In the operating position II the second part 24 of the exhaust nozzle bell 22 is locked by the engaging or locking device (not shown) already mentioned.

In the third exemplary embodiment shown in FIGS. 3a) and b) a first rolling bellows 36 that is connected on the one hand at a connection area 36a to the first part 33 of the exhaust nozzle bell 32 and on the other hand at a connection area 36b to the second part 34 of the exhaust nozzle bell 32, and a second rolling bellows 38 that is connected on the one hand to a fixed part 38a of the aircraft or spacecraft 300 and on the other hand to a circumferential area 38b of the second part 34 of the exhaust nozzle bell 32 are provided. In this exemplary embodiment the circumferential area 38b of the second part 34 of the exhaust nozzle bell 32 to which circumferential area the second rolling bellows 38 is connected, is different from the circumferential area 36b to which the first rolling bellows 36 is connected and is located radially outside and to the rear of the latter.

In this third exemplary embodiment a retaining device 39 is provided that comprises a retaining bellows 39 that extends between a circumferential area 36a of the first part 33 of the exhaust nozzle bell 32 and a circumferential area 38b of the second part 34 of the exhaust nozzle bell 32 and is arranged lying forward with respect to the first rolling bellows 36 and together with the first rolling bellows 36 forms a further closed volume R that can be acted on with a gaseous fluid. In the exemplary embodiment shown, the retaining bellows 39 on the one hand is fixed to the first part 33 of the exhaust nozzle bell 32 at the same circumferential area 36a to which the first rolling bellows 36 is connected, and to the second part 34 of the exhaust nozzle bell 32 at the same circumferential area 38b to which the second rolling bellows is also connected which, however, is not necessary. The circumferential area 38b of the second part 34 of the exhaust nozzle bell 32 to which the retaining bellows 39 is fixed is located radially outside the circumferential area 36b to which the first rolling bellows 36 is connected. When acted on with the gaseous fluid, the closed volume R limited between the first rolling bellows 36 and the retaining bellows 39, under enlargement of the volume causes a braking of the movement during the extension of the second part 34 of the exhaust nozzle bell 32 from the stowed position I into the operating position II. The acting on the closed volume R with the gaseous fluid preferably takes place independently of the acting on the closed volume 25.

To extend the second part 34 of the exhaust nozzle bell 32 from the stowed position I shown in FIG. 3a) into the operating position II shown in FIG. 3b), the volume 35 enclosed— in this case indirectly via the retaining bellows 39 lying between them—between the second rolling bellows 38 and the first rolling bellows 36 is acted on with the gaseous fluid, through which it has a tendency to expand and thus to extend the second part 34 of the exhaust nozzle bell 32 into the operating position II. When the operating position II is reached, the second part 34 of the exhaust nozzle bell 32 is locked by the engaging or locking device (not shown) already mentioned several times.

In the fourth exemplary embodiment of the exhaust nozzle bell according to the invention shown in FIGS. 4a) and b), in a similar manner to the third exemplary embodiment shown in FIGS. 3a) and b), a first rolling bellows 46 is provided which is connected on the one hand to a circumferential area 46a of the first part 43 of the exhaust nozzle bell 42 and on the other hand to a circumferential area 46b of the second part 44 of the exhaust nozzle bell 42, and a second rolling bellows 48 that is connected on the one hand to a fixed part 48a of the aircraft or spacecraft 400 and on the other hand to a circumferential area 48b of the second part 44 of the exhaust nozzle bell 42. The first rolling bellows 46 and the second rolling bellows 48 in turn form a closed volume 45 lying outside the exhaust nozzle bell 42, which volume can be acted on by the gaseous fluid.

In this fourth exemplary embodiment, a retaining device 47, 49 is provided that comprises a retaining and centering bellows 47 extending between a front circumferential area 47a of the first part 43 and a front circumferential area 47b of the second part 44 of the exhaust nozzle bell 42, and a retaining and centering bellows 49 extending between a rear circumferential area 49a of the first part 43 and a rear circumferential area 49b of the second part 44 of the exhaust nozzle bell 42. The retaining device 47, 49 thus formed is used on the one hand to brake the movement during the extension of the second part 44 of the exhaust nozzle bell 42 from the stowed position I shown in FIG. 4a) into the operating position II shown in FIG. 4b) and at the same time to center the second part 44 of the exhaust nozzle bell 42 during this movement.

To extend the second rolling bellows 48, the enclosed volume 45 is acted on by the gaseous fluid and thus has a tendency to extend the second part 44 of the exhaust nozzle bell 42 into the operating position II. In the course of this movement the retaining and centering bellows 47, 49 are increasingly pressurized whereby they are separated at a preset breaking point provided for this. When the operating position II shown in FIG. 4b) is reached, the second part 44 of the exhaust nozzle bell 42 is locked by the mentioned engaging or locking device (not shown).

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An extendible exhaust nozzle bell for a rocket engine of an aircraft or spacecraft, comprising:
   a first part and a second part, wherein said first part, which has a smaller diameter than said second part, is fixedly arranged on a motor of the rocket engine and said second part is arranged to be movable with respect to the first part, such that said second part, in a front stowed position, is located to surround said first part and, in a rear operating position, is located to continue the first part;
   a closed volume, formed at least in part by a deformable rolling bellows arrangement, such that, when the closed volume is acted on by a gaseous fluid to enlarge the volume, said second part is structured and arranged to extend from said front stowed position into said rear operating position; and
   a portion of the deformable rolling bellows arrangement is connected to an external surface of said second part and to a fixed part of one of the rocket engine, the aircraft, or the spacecraft.

2. The extendible exhaust bell in accordance with claim 1, wherein, when in said front stowed position, said second part is positioned closer to the rocket motor than when in said rear operating position.

3. The extendible exhaust bell in accordance with claim 1, wherein said rolling bellows arrangement comprises at least one rolling bellows formed essentially in a rotationally symmetrical manner with respect to the longitudinal axis of the rocket engine.

4. The extendible exhaust bell in accordance with claim 3, wherein said at least one rolling bellows is formed to circulate over an entire circumference of the exhaust nozzle bell.

5. The extendible exhaust bell in accordance with claim 1, wherein said rolling bellows arrangement comprises:
   a first rolling bellows structured and arranged to form a seal for the gaseous fluid that is connected to one of a circumferential area of said first part or another fixed part of the aircraft or spacecraft and to a circumferential area of said second part; and
   a second bellows structured and arranged to form a further seal of the volume for the gaseous fluid limited by the said first rolling bellows.

6. The extendible exhaust bell in accordance with claim 5, wherein said second bellows comprises a sealing bellows that closes a jet opening of said second part and that, together with said first rolling bellows and said first and second parts, is structured and arranged to limit the closed volume acted on by the gaseous fluid inside the exhaust nozzle bell.

7. The extendible exhaust bell in accordance with claim 6, wherein said circumferential area of said first part to which said first rolling bellows is connected is located on a rear end of said first part, and said circumferential area of said second part to which said first rolling bellows is connected is located on a front end of said second part.

8. The extendible exhaust bell in accordance with claim 6, wherein said sealing bellows are structured to include a preset breaking point at which said sealing bellows burst open.

9. The extendible exhaust bell in accordance with claim 8, wherein said preset breaking point is designed to correspond to the extension of said second part into said operating position in order to clear said jet opening.

10. The extendible exhaust bell in accordance with claim 5, wherein said second bellows comprises a second rolling bellows connected to a fixed part of the aircraft or spacecraft and to a circumferential area of said second part, which forms a further seal for the gaseous fluid, which lies at least in part radially outside with respect to said first rolling bellows,
   whereby said closed volume acted on by the gaseous fluid is located at least in part outside the exhaust nozzle bell and is limited between said first rolling bellows and said second rolling bellows.

11. The extendible exhaust bell in accordance with claim 10, wherein said circumferential area of said second part to which the second rolling bellows is connected is essentially a same circumferential area of said second part to which said first rolling bellows is connected.

12. The extendible exhaust bell in accordance with claim 10, wherein said circumferential area of said second part to which said second rolling bellows is connected is different from said circumferential area of said second part to which said first rolling bellows is connected.

13. The extendible exhaust bell in accordance with claim 12, wherein said circumferential area of said second part to which said second rolling bellows is connected is located radially outside and to the rear of said circumferential area of said second part to which said first rolling bellows is connected.

14. The extendible exhaust bell in accordance with claim 1, further comprising a retaining device structured and arranged to brake movement during extension of said second part from said front stowed position into said rear operating position.

15. The extendible exhaust bell in accordance with claim 14, wherein said retaining device is further structured and arranged to center said second part during said extension from said front stowed position into said rear operating position.

16. The extendible exhaust bell in accordance with claim 14, wherein said retaining device comprises one or more retaining cables coupled with a cable brake that extend between said second part and a fixed part of the aircraft or spacecraft.

17. The extendible exhaust bell in accordance with claim 14, wherein said retaining device comprises a retaining bellows that extends between a circumferential area of said first part and a circumferential area of said second part, said retaining device being arranged at a front, with respect to said first rolling bellows, and together with said first rolling bellows, forms a further closed volume to be acted on with a gaseous fluid.

18. The extendible exhaust bell in accordance with claim 14, wherein said retaining device comprises a retaining and centering bellows that extends between a circumferential area of said first part and a circumferential area of said second part, said retaining device being arranged at a front, with respect to said first rolling bellows, and together with said first rolling bellows to form the volume, and, when the volume is acted on with the gaseous fluid, and enlargement of the volume causes a braking of the movement during extension of said second part from said front stowed position into said rear operating position.

19. The extendible exhaust bell in accordance with claim 17, wherein said retaining bellows are fixed to a circumferential area of said second part that is located radially outside said circumferential area of said second part to which said first rolling bellows is connected.

20. The extendible exhaust bell in accordance with claim 17, wherein said retaining bellows are arranged between said first rolling bellows and said second rolling bellows.

21. The extendible exhaust bell in accordance with claim 14, wherein said retaining device comprises retaining and centering bellows extending between a front circumferential area of said first part and a front circumferential area of said second part.

22. The extendible exhaust bell in accordance with claim 14, wherein said retaining device comprises retaining and centering bellows extending between a rear circumferential area of said first part and a rear circumferential area of said second part.

23. The extendible exhaust bell in accordance with claim 21, wherein said retaining and centering bellows are structured and arranged to burst or separate.

24. The extendible exhaust bell in accordance with claim 23, wherein said retaining and centering bellows are structured and arranged to burst or separate at a preset breaking point, which is achieved, at the latest, after said second part is located in said rear operating position.

25. An extendible exhaust nozzle bell for a rocket engine of an aircraft or spacecraft, comprising:
   a first part and a second part, wherein said first part, which has a smaller diameter than said second part, is fixedly arranged on a motor of the rocket engine and said second part is arranged in a flexible manner with respect to the first part, such that, in a front stowed position, said second part is located to surround said first part and, in a rear operating position, is located to continue the first part;
   a closed volume acted on by a gaseous fluid, which, when acted on by the gaseous fluid by enlargement of the volume, said first and second parts are structured and arranged to extend said second part from said front stowed position into said rear operating position; and
   said closed volume being formed at least in part by a deformable rolling bellows arrangement arranged to an exterior of the first and second parts in the rear operating position.

26. The extendible exhaust nozzle bell in accordance with 25, wherein the deformable bellows are connected to said second part and to a fixed part of one of the rocket engine, the aircraft, or the spacecraft.

27. An extendible exhaust nozzle bell for a rocket engine of an aircraft or spacecraft, comprising:
   a first part and a second part, wherein said first part, which has a smaller diameter than said second part, is fixedly arranged on a motor of the rocket engine and said second part is arranged, such that, in a front stowed position, said second part surrounds said first part and, in a rear operating position, said second part continues the first part; and
   a closed volume, formed at least in part by a deformable rolling bellows arrangement that is structured and arranged to move the second part from the front stowed position to the rear operating position,
   wherein the deformable rolling bellows arrangement, in at least the rear operating position, is arranged to an exterior of the first and second parts.

28. The extendible exhaust nozzle bell in accordance with claim 27, wherein the bellows arrangement comprises a first bellow coupled to exteriors of the first and second parts.

29. The extendible exhaust nozzle bell in accordance with claim 28, wherein the bellows arrangement further comprises a second bellow located exterior to the first and second parts.

30. The extendible exhaust nozzle bell in accordance with claim 27, wherein the bellows arrangement comprises a bellow located exterior to the first and second parts.

* * * * *